(12) United States Patent
Sezginer et al.

(10) Patent No.: US 11,270,430 B2
(45) Date of Patent: Mar. 8, 2022

(54) WAFER INSPECTION USING DIFFERENCE IMAGES

(71) Applicant: KLA-TENCOR CORPORATION, Milpitas, CA (US)

(72) Inventors: Abdurrahman Sezginer, Monte Sereno, CA (US); Xiaochun Li, Milpitas, CA (US); Pavan Kumar, San Jose, CA (US); Junqing Huang, Fremont, CA (US); Lisheng Gao, Saratoga, CA (US); Grace H. Chen, Los Gatos, CA (US); Yalin Xiong, Pleasanton, CA (US); Hawren Fang, San Jose, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 967 days.

(21) Appl. No.: 15/971,536

(22) Filed: May 4, 2018

(65) Prior Publication Data
US 2018/0342051 A1 Nov. 29, 2018

Related U.S. Application Data

(60) Provisional application No. 62/510,259, filed on May 23, 2017.

(51) Int. Cl.
*G06T 7/00* (2017.01)
(52) U.S. Cl.
CPC .... *G06T 7/001* (2013.01); *G06T 2207/10056* (2013.01); *G06T 2207/10148* (2013.01);
(Continued)

(58) Field of Classification Search
CPC .......... G06T 7/001; G06T 2207/10056; G06T 2207/10148; G06T 2207/10152;
(Continued)

(56) References Cited

U.S. PATENT DOCUMENTS 5,917,588 A * 6/1999 Addiego .............. G01N 21/956
356/237.2
9,766,187 B2 * 9/2017 Chen ................ G01N 21/95607
(Continued)

FOREIGN PATENT DOCUMENTS

| TW | 201504749 A | 2/2015 |
|---|---|---|
| WO | 2015171654 A1 | 11/2015 |
| WO | 2017063827 A1 | 4/2017 |

OTHER PUBLICATIONS

ISA/KR, International Search Report for PCT/US2018/034192 dated Aug. 23, 2018.
(Continued)

*Primary Examiner* — John B Strege
(74) *Attorney, Agent, or Firm* — Hodgson Russ LLP

(57) ABSTRACT

Systems and methods increase the signal to noise ratio of optical inspection of wafers to obtain higher inspection sensitivity. The computed reference image can minimize a norm of the difference of the test image and the computed reference image. A difference image between the test image and a computed reference image is determined. The computed reference image includes a linear combination of a second set of images.

18 Claims, 3 Drawing Sheets

(52) U.S. Cl.
CPC ............... *G06T 2207/10152* (2013.01); *G06T 2207/30148* (2013.01)

(58) Field of Classification Search
CPC ........... G06T 2207/30148; H01L 22/10; H01L 22/20; G01N 21/8851; G01N 2021/8887
See application file for complete search history.

(56) References Cited

U.S. PATENT DOCUMENTS

| | | | |
|---|---|---|---|
| 2001/0055415 A1 | 12/2001 | Nozaki | |
| 2006/0018530 A1* | 1/2006 | Oaki | ........................ G06T 7/001 382/144 |
| 2007/0121106 A1* | 5/2007 | Shibata | ................... G06T 7/001 356/237.2 |
| 2010/0002930 A1* | 1/2010 | Miyano | ............ G01N 21/95607 382/144 |
| 2012/0070089 A1* | 3/2012 | Yamada | ............... G06K 9/6255 382/209 |
| 2013/0070078 A1* | 3/2013 | Takagi | .................... G06T 7/001 348/80 |
| 2014/0219546 A1* | 8/2014 | Minekawa | ............ G06T 7/0004 382/149 |
| 2014/0301630 A1 | 10/2014 | Kulkarni et al. | |
| 2015/0221076 A1* | 8/2015 | Gao | ........................ G06T 7/001 382/149 |
| 2015/0287178 A1 | 10/2015 | Amzaleg et al. | |
| 2015/0300965 A1 | 10/2015 | Sezginer et al. | |
| 2015/0356727 A1* | 12/2015 | Urano | .................... G06T 1/0007 382/149 |
| 2016/0321800 A1* | 11/2016 | Thattaisundaram | ........................ G01N 21/9501 |

OTHER PUBLICATIONS

TIPO, First Office Action for TW Application No. 107117467, dated Nov. 9, 2021 (see X/Y/A designations on p. 11).

\* cited by examiner

WAFER INSPECTION USING DIFFERENCE IMAGES

CROSS-REFERENCE TO RELATED APPLICATIONS

This application claims priority to the provisional patent application filed May 23, 2017 and assigned U.S. App. No. 62/510,259, the disclosure of which is hereby incorporated by reference.

FIELD OF THE DISCLOSURE

This disclosure relates to semiconductor wafer inspection.

BACKGROUND OF THE DISCLOSURE

Economics of manufacturing very-large scale integrated circuits leads to progressive reduction of critical dimensions of integrated circuits. As device dimensions decrease, the size of tolerable defects also decreases, which in turn requires defect inspection equipment with higher sensitivity.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Defects can form during any of these processes. Therefore, wafers are inspected for defects after more than one process step. Multiple semiconductor devices may be fabricated in an arrangement on a single semiconductor wafer and then separated into individual semiconductor devices, or dies.

Difference images have been used in defect detection. This typically involved obtaining a reference image at a neighboring die or a median of images acquired at multiple dies. The difference image has been obtained by subtracting the reference image from the image of a target die. However, some image differences were typically flagged incorrectly as potential defects. Tool or wafer process conditions can vary from die-to-die, which can provide an undesired contribution to the difference image and reduce signal-to-noise ratio. Both these effects can impact the sensitivity of the inspection.

Images of dies can differ from one another even if no defect is present. Critical dimension (CD), edge profiles of patterned features, or layer thicknesses can vary across a wafer. These variations can contribute to a difference image even when the variations are within tolerances.

Besides different wafer process conditions on different dies, a tool autofocus system can have an error margin. Focus variation can cause images of dies to differ. Such variations may need to be accommodated to prevent false positives.

Therefore, a new system and method to detect defects is needed.

BRIEF SUMMARY OF THE DISCLOSURE

In a first embodiment, a method is provided. A test image of a die under test on a wafer and images of a second set of dies are received at a processor. A difference image between the test image and a computed reference image is determined using the processor. The computed reference image is derived from the images of the second set of dies such that a norm of the difference image is minimized. Defects on the difference image are detected using the processor.

The computed reference image may be a linear combination of the images of the second set of dies. The computed reference image also may be a linear combination of terms, wherein each term is a convolution of an adjustable filter with an image of one of the dies in the second set of dies.

A sum of squares of pixels of the difference image may be minimized.

The images of the second set of dies may be acquired at different imaging conditions. The different imaging conditions can include different parameters for at least one of focus, illumination pupil shape, illumination polarization, illumination wavelength spectrum, imaging numerical aperture, imaging pupil shape, imaging pupil analyzer, imaging pupil jones matrix, imaging pupil apodization, or imaging pupil wavefront. The different imaging conditions also can include different parameters of the focus for each of the images of the second set of dies.

The second set of dies may be on one or more wafers other than the wafer with the die under test. In an instance, the second set of dies are on different wafers and a thickness of a layer changes from wafer to wafer. In another instance, the second set of dies are printed using different lithographic exposure doses. In yet another instance, the second set of dies are printed using different lithographic focus settings.

At least one of the second set of dies may be at an edge of a wafer.

Each of the test image and the images of the second set of dies can be acquired from one of an optical microscope, a laser scanning system, a near-field microscope, an electron beam microscope, an ion beam microscope, an x-ray microscope, an atomic force microscope, or a ptychographic imaging system.

In an instance, the method further includes forming a data matrix such that each column of the data matrix is an aligned image of a die and decomposing the data matrix into two parts. A first matrix of the two parts is low-rank and a second matrix of the two parts has at least one non-zero entity. The second matrix includes isolated point defects and the first matrix includes a pattern of the wafer and process variations.

The computed reference image can be determined from the images of the second set of dies using the processor.

In a second embodiment, a system is provided. The system includes a processor in electronic communication with an electronic data storage unit and a wafer inspection tool. The processor is configured to execute instructions that determine a difference image between the test image and a computed reference image, and then detecting defects using the difference image. The computed reference image is derived from images of a second set of dies such that a norm of the difference image is minimized.

The wafer inspection tool can be one of an optical microscope, a laser scanning system, a near-field microscope, an electron beam microscope, an ion beam microscope, an x-ray microscope, an atomic force microscope, or a ptychographic imaging system. The processor may be part of the wafer inspection tool.

A sum of squares of pixels of the difference image can be minimized.

Each of the images of the second set of dies can be acquired at different imaging conditions. The different imaging conditions can include different parameters for at least one of illumination pupil shape, illumination polarization, illumination wavelength spectrum, focus, imaging numerical aperture, imaging pupil shape, imaging pupil analyzer, imaging pupil jones matrix, imaging pupil apodization, or imaging pupil wavefront. The different imaging conditions can include different parameters of the focus for each of the images of the second set of dies.

The processor may be further configured to determine the computed reference image from the images of the second set of dies.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments of the present disclosure can increase the signal to noise ratio of optical inspection of wafers. Higher inspection sensitivity can be obtained. The computed reference image can minimize a norm of the difference of a test image and a computed reference image. This can help find defects and ignore benign variations during inspection.

In embodiments disclosed herein, a reference image is determined from images acquired at multiple reference dies. It is assumed that the defect is on the test die and that the reference dies are defect-free. Images acquired at multiple reference dies reveal how the image can change from die-to-die in a benign way. These benign variations can include, but are not limited to, patterns, layer thickness, tool focus at different regions, CD, edge profiles of patterned features, or layer thicknesses either across a wafer or across multiple wafers. When forming the difference image between the test image and the computed reference image in embodiments disclosed herein, differences observed between reference dies can be discounted. The test image and the reference images can each be acquired from an inspection tool. In an embodiment, the imaging tool is an optical imaging tool that has a broad band plasma (BBP) light source. The imaging tool can be configured either in a bright-field or dark-field configuration. In another embodiment, test and reference images are acquired by a laser scanning system. In other embodiments, the inspection tool can be an electron beam microscope, an ion beam microscope, an x-ray microscope, or a ptychographic imaging system, a scanning near-field microscope, or an atomic force microscope.

Figure 1:
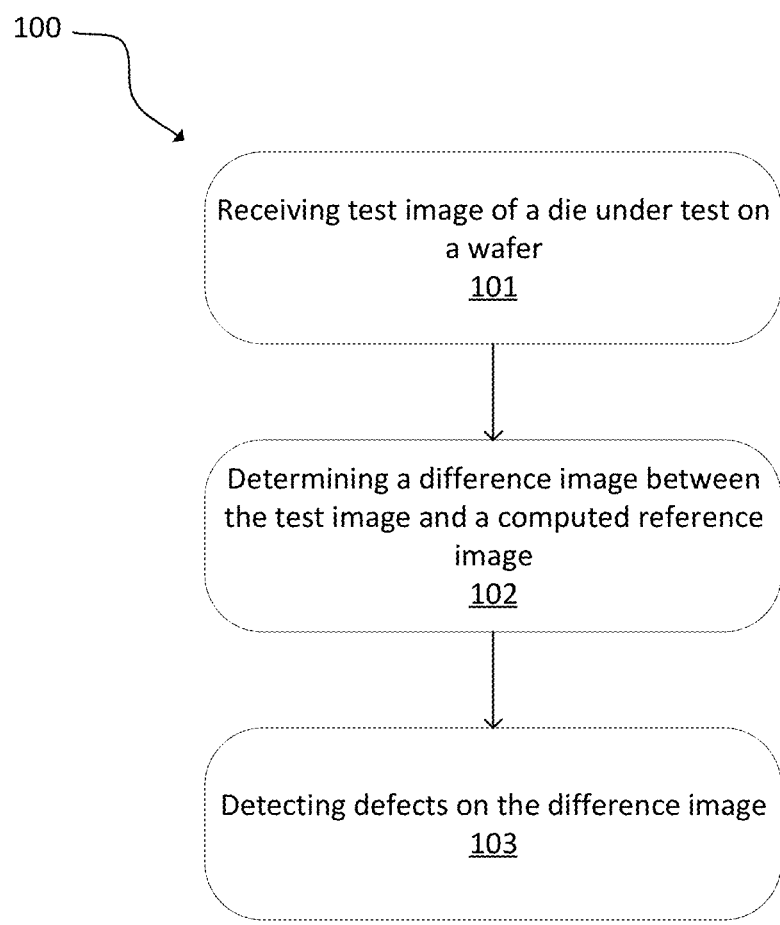
FIG. 1 is a flowchart of an embodiment of a method in accordance with the present disclosure.

FIG. 1 is a flowchart of a method 100. A test image of a die under test is received at a processor at 101. Images of a second set of dies also may be received.

Using the processor, a difference image between the test image and a computed reference image is determined at 102. The computed reference image is derived from the images of the second set of dies such that a norm of the difference image is minimized. The computed reference image can include a linear combination of the second set of dies. For example, weights in the linear combination may be determined such that the norm of the difference image is minimized. The computed reference image also may be a linear combination of terms. Each term can be a convolution of an adjustable filter with an image of one of the dies in the second set of dies.

The method of FIG. 1 is illustrated with the following equations.

$$I_{ref}(x, y) = \sum_{die \neq test} c_{die} I_{die}(x, y)$$

$$c \text{ minimizes } \|I_{ref}(x, y) - I_{test}\|$$

In these equations, (x,y) is a position of a pixel in an image (integer-valued), $I_{die}(x,y)$ is intensity at pixel (x,y) of the image of a particular die, $c_{die}$ is a scalar, real-valued coefficient that multiplies the image $I_{die}(x,y)$, $I_{ref}$ is a reference image (e.g., an image of another die), and $I_{ref}(x,y)$ is the intensity of the image at pixel (x,y). The subscript "die" is integer-valued index that identifies a die on the wafer. The index "test" is the index of the die under test.

In an embodiment, each unknown coefficient can be made into a small unknown filter (e.g., 7×7) using the following equations. This embodiment can discount small alignment errors and blur differences between die images.

$$I_{ref}(x, y) = \sum_{die \neq test} c_{die} \otimes I_{die}(x, y)$$

$$c \text{ minimizes } \|I_{ref}(x, y) - I_{test}\|$$

In this case, $c_{die}$ is not a scalar but is a small 2-dimensional array such as 3×3. The operator ⊗ denotes 2-dimensional convolution.

In an embodiment, the norm is the difference image and the minimization algorithm is a linear least squares algorithm.

In an embodiment, a sum of squares of pixels in the difference image is minimized.

A separate reference image can be computed for each test image. The difference image may be the test image minus the computed reference image. The difference image and the computed reference image are used for detecting defects at 103, and the defects can be classified.

Figure 3:
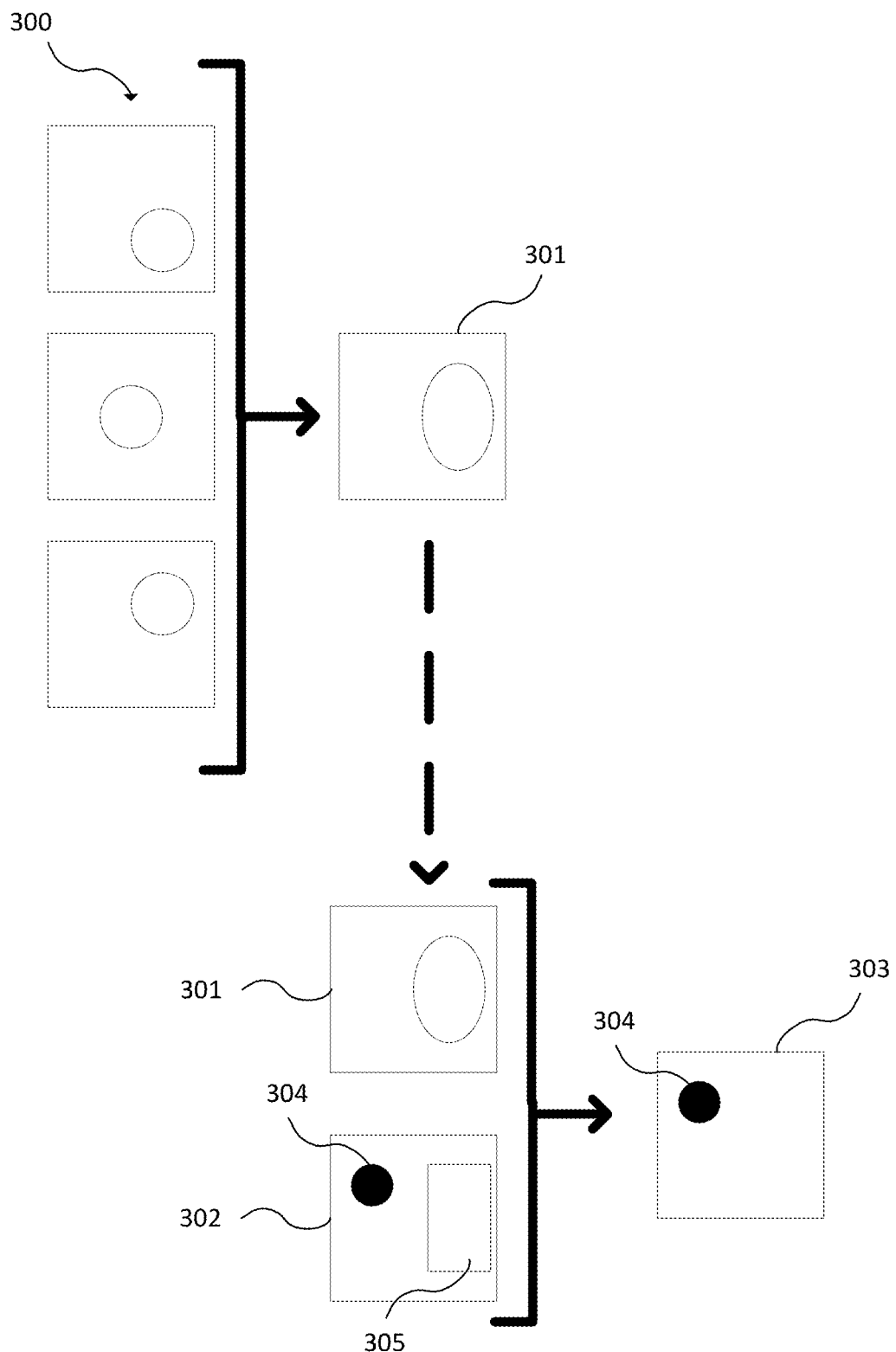
FIG. 3 is a flowchart showing exemplary images using the method of FIG. 1.

FIG. 3 is a flowchart showing exemplary images using the method of FIG. 1. Three reference images 300 of a second set of dies are combined with a linear combination to form the computed reference image 301. While three reference images 300 are illustrated, more or fewer reference images 300 may be used.

Image subtraction is used to form the difference image 303 from the computed reference image 301 and the test image 302. Weights in the linear combination may be determined such that a norm of the difference image 303 is minimized. The difference image 303 and the test image 302 include a defect 304. The test image 302 also includes benign variations 305. If one of the reference images 300 of the second set of dies was used with the test image 302 to form the difference image 303 using image subtraction, then some of the benign variations 305 may have appeared in the difference image 303. These benign variations 305 could have been incorrectly classified as a defect. The benign variations 305 are more likely to be ignored in the difference image 303 if the computed reference image 301 is used.

In some applications, the test and reference images may be acquired from different wafers. For example, to determine if a lithographic reticle (mask) has degraded, a newly printed test wafer is compared to a previously printed reference wafer. The comparison of test and reference wafers can be compromised either if the imaging conditions of the lithography projector or the inspection tool changes between the test and reference wafers. Focus setting is one of the imaging conditions that can change because autofocus systems have a finite tolerance. Such changes can create benign (nuisance) differences between test and reference images that can interfere with detecting defects.

To solve this problem, in the method of FIG. 1, each of the images of the second set of dies may be acquired at different imaging condition of the inspection systems. For example, the images of the second set of dies can be acquired at multiple focus settings to discount the effect of focus fluctuations in the difference image. Other than focus, imaging conditions include illumination intensity, illumination pupil shape, illumination polarization, illumination wavelength spectrum, imaging numerical aperture, imaging pupil shape, imaging pupil analyzer, imaging pupil jones matrix, imaging pupil apodization, or imaging pupil wavefront. If any of these imaging conditions are subject to drift, they can be intentionally modulated between reference dies. In an instance, the focus is different for each of the images of the second set of dies.

The second set of dies may each be from a different wafer than the wafer with the die in the test image or a different part of the wafer with the die in the test image. For example, a thickness of a layer that is imaged, a lithographic exposure dose of a layer that imaged, and a lithographic focus of a layer that is imaged in each of the images of the second set of dies can be different.

In a first example, multiple wafers may be manufactured with different layers thicknesses. For example, a 100 nm thick interlayer dielectric may be deposited on a first wafer and a 105 nm thick interlayer dielectric may be deposited on a second wafer. Images of the second set of dies are acquired from both the first and second wafers. The test image is acquired from a nominal wafer. The differences between images of the second set of dies can be saved for subsequent inspections of wafers manufactured at the nominal conditions.

In a second example, multiple wafers are manufactured where each wafer has a layer with a different lithographic exposure dose. Images of the second set of dies are acquired from the multiple wafers. The test image is acquired from a nominal wafer. The differences between images of the second set of dies can be saved for subsequent inspections of wafers manufactured at the nominal conditions.

In a third example, multiple wafers are manufactured where each wafer has a layer with a different lithographic focus. Images of the second set of dies are acquired from the multiple wafers. The test image is acquired from a nominal wafer. The differences between images of the second set of dies can be saved for subsequent inspections of wafers manufactured at the nominal conditions.

At least one of the second set of dies may be of an edge die. The dies on the edge of a wafer are generally subject to different process conditions. Bake plates, rapid thermal anneal, etch, deposition, CMP, and lithography processes can have variations at the edge of the wafer. Images of an edge die, acquired by the wafer inspection tool, generally differ from images of other dies due to these process variations. Most of these variations are not considered defects.

Generating a computed reference image from non-edge dies to inspect an edge die sometimes yields unsatisfactory sensitivity to defects of interest. The difference image can be dominated by process variations, which can make it difficult to single out defects of interest. In an instance, the root mean square (RMS) difference image is larger at the edge dies. This may be caused by difficulty extrapolating from other dies to the edge die or higher wafer noise on the edge die.

To address these issues, the images of the second set of dies can be generated from all dies on the wafer, including both edge and center dies. For example, the computed reference image can be generated from multiple dies including at least one edge die other than the die under test (e.g., the target die). Using edge dies with other dies can reduce residual at the edge die. In an instance, edge dies are linearized separately from center dies.

The computed reference image can be generated using principle component analysis (PCA). An embodiment of PCA can be summarized as follows.

$A = [\text{img}(die1)\ \text{img}(die2) \ldots \text{img}(dieN)]$ Columns of A are images of training dies $A = USV^T$ Singular Value Decomposition $\tilde{U} = [u_1\ u_2\ \ldots\ u_m]$ First m <N columns of U corresponding to the largest m singular values Reference = $\tilde{U}\tilde{U}^T$ Target In these equations, A is a matrix. Each column of A is the image of a die. The pixels of the image are re-arranged as a column vector. U and V are each a matrix. The columns of U are left-singular vectors of A. The columns of V are right-singular vectors of A. S is a diagonal matrix, wherein its diagonal entries are the singular vales of A. $\tilde{U}$ is a sub-matrix of U. Superscript T indicates transposition. "Reference" in the computed reference image. It is arranged as a column vector. "Target" is the image of the target die (e.g., the die under test).

If one of the dies contains a massive defect, that die image can become a principal component and be considered normal (i.e., not a defect) using PCA. The steps below can avoid this.

Step 1) $D = [I_{tar,1}\ I_{tar,2}\ \ldots\ I_{tar,N_{dies}}]$ data matrix

Step 2) $USV^T = D$

Step 3) Determine rank r, the boundary between principal components and noise

Step 4) $I_{dif,n} = I_{tar,n} - U(:,1:r)U(:,1:r)^\wedge(T_{Itar,n})$

Step 5) Find m for which R M S ($I_{dif,m}$) is anomalously low, discard $I_{tar,m}$ from the data matrix D Step 6) Repeat steps 2 through 4

In steps 1-6, D is similar to A above. D is a matrix. Each column of D is the image of a die. The pixels of the image are arranged as a column vector. D contains images of all dies to be inspected. "tar" is short for target. "tar,1" is the index of the first target die, etc. I tar,n is the acquired image for the nth die. I dif,n is the difference image for the nth die, which may be a computed quantity. D is of size $p \times N_{dies}$. In an example, $P \gg N_{dies}$. p is the number of pixels in one of the images. U is matrix of size $p \times N_{dies}$, wherein the columns of U are left-singular vectors of A. V is a matrix of size $N_{dies} \times N_{dies}$, wherein the columns of V are right-singular vectors of A. S is a diagonal matrix of size $N_{dies}$ having diagonal entries that are the singular vales of A. RMS of an image stands for square root of the mean of the squares of pixel values of an image.

In another embodiment, a data matrix is formed such that each column of the data matrix is an aligned image of a die. The data matrix is then decomposed into two parts. A first matrix of the two parts is low-rank and a second matrix of the two parts has at least one non-zero entity. The second matrix includes isolated point defects and the first matrix includes a pattern of the wafer and process variations.

In an example, a data matrix D is formed such that each column of the data matrix is an aligned image of a die. Images of multiple dies are processed together. The data matrix D is decomposed into two parts L+S, where the matrix L is low-rank and the matrix S is sparse (e.g., has few non-zero entries). The decomposition is performed using a robust PCA algorithm. The matrix S contains isolated point-defects, and the pattern on the wafer and its process variations are contained in L.

In an example of the method of FIG. 1, which is intended to be illustrative and is not intended to be limiting, a reference image is determined for each single die. The test die is then compared with the computed reference image for defect detection. The computed reference image can include a linear combination of a plurality of reference images such that weights in the linear combination are determined such that a norm of the difference image is minimized. The reference image calculation is based on all the remaining die images. In doing so, the disclosed defect detection technique can suppress noise, boost a signal-to-noise ratio of a defect of interest (DOI), have more tolerance to tool focusing variation from die to die, and have more tolerance to wafer color variation.

Figure 2:
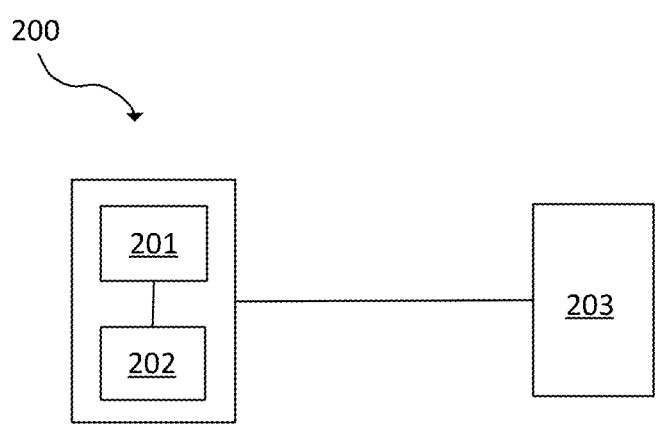
FIG. 2 is a block diagram of an embodiment of a system in accordance with the present disclosure.

FIG. 2 is a block diagram of an embodiment of a system. The system 200 includes a processor 201 and an electronic storage unit 202 in electronic communication with the processor 201. Both the processor 201 and the electronic storage unit 202 are in electronic communication with the wafer inspection tool 203. The processor 201 may include a microprocessor, a microcontroller, or other devices. A wafer inspection tool 203, which may be an optical inspection microscope, a laser scanning system, a near-field microscope, an electron beam microscope, an ion beam microscope, an x-ray microscope, an atomic force microscope, or a ptychographic imaging system, can generate information used by the processor 201. The processor 201 and/or the electronic storage unit 202 optionally may be in electronic communication with a wafer metrology tool or wafer review tool (not illustrated) to receive additional information. For example, the processor 201 and/or the electronic storage unit 202 may be in electronic communication with a BBP tool.

The processor 201 and electronic storage unit 202 may be part of the wafer inspection tool 203 or another device. In an example, the processor 201 and electronic storage unit 202 may be part of a standalone control unit or in a centralized quality control unit. Multiple processors 201 or electronic storage unit 202 may be used.

The processor 201 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 201 to implement various methods and functions may be stored in readable storage media, such as a memory in the electronic storage unit 202 or other memory.

The processor 201 may be coupled to the components of the system 200 in any suitable manner (e.g., via one or more transmission media, which may include wired and/or wireless transmission media) such that the processor 201 can receive output. The processor 201 may be configured to perform a number of functions using the output.

The processor 201, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a processor for performing defect detection, as disclosed herein. In particular, the processor 201 can be coupled to a memory in the electronic storage unit 202 or other electronic data storage medium with non-transitory computer-readable medium that includes program instructions executable on the processor 201. The computer-implemented method may include any step(s) of any method(s) described herein. For example, the processor 201 may be programmed to perform some or all of the steps of FIG. 1 or other embodiments disclosed herein.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

In an instance, the processor 201 is configured to execute instructions that determine a difference image between a test image and a computed reference image. The computed reference image is derived from images of a second set of dies such that the norm of the difference image is minimized. Then defects can be detected using the difference image.

A sum of squares of pixels of the difference image may be minimized.

Each of the images of the second set of dies can be acquired at different imaging conditions. For example, the different imaging conditions can include different parameters for at least one of illumination pupil shape, illumination polarization, illumination wavelength spectrum, focus, imaging numerical aperture, imaging pupil shape, imaging pupil analyzer, imaging pupil jones matrix, imaging pupil apodization, or imaging pupil wavefront. The different imaging conditions also can include different parameters of the focus for each of the images of the second set of dies.

The processor 201 also can determine the computed reference image from the plurality of reference images. The computed reference image can be determined for a particular test image or can be determined based on other inputs.

The images of the second set of dies may each be from a different wafer than the wafer with the die in the test image.

At least one of the images of the second set of dies may be of an edge die.

Program instructions implementing methods such as those described herein may be stored on computer-readable medium, such as in the electronic storage unit 202 or other storage medium. The computer-readable medium may be a storage medium such as a magnetic or optical disk, a magnetic tape, or any other suitable non-transitory computer-readable medium known in the art. For example, the memory in the electronic storage unit 202 or other electronic data storage medium may be a storage medium such as a magnetic or optical disk, a magnetic tape, or any other suitable non-transitory computer-readable medium known in the art. In particular, the electronic data storage unit 202 can include persistent storage, random access memory, or a split database.

In an instance, the non-transitory computer-readable storage medium comprises one or more programs for executing steps on one or more computing devices. The steps on the non-transitory computer-readable storage medium can include some or all of the steps of FIG. 1 or other embodiments disclosed herein.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
   receiving, at a processor, a test image of a die under test on a wafer;
   receiving, at the processor, images of a second set of dies;
   determining a difference image between the test image and a computed reference image using the processor, wherein the computed reference image is derived from the images of the second set of dies such that a norm of the difference image is minimized, wherein the computed reference image is a linear combination of terms, each term being a convolution of an adjustable filter with an image of one of the dies in the second set of dies; and
   detecting defects on the difference image using the processor.

2. The method of claim 1, wherein a sum of squares of pixels of the difference image is minimized.

3. The method of claim 1, wherein the images of the second set of dies are acquired at different imaging conditions.

4. The method of claim 3, wherein the different imaging conditions include different parameters for at least one of focus, illumination pupil shape, illumination polarization, illumination wavelength spectrum, imaging numerical aperture, imaging pupil shape, imaging pupil analyzer, imaging pupil jones matrix, imaging pupil apodization, or imaging pupil wavefront.

5. The method of claim 4, wherein the different imaging conditions include different parameters of the focus for each of the images of the second set of dies.

6. The method of claim 1, wherein the second set of dies are on one or more wafers other than the wafer with the die under test.

7. The method of claim 6, wherein the second set of dies are on different wafers and a thickness of a layer changes from wafer to wafer.

8. The method of claim 6, wherein the second set of dies are printed using different lithographic exposure doses.

9. The method of claim 6, wherein the second set of dies are printed using different lithographic focus settings.

10. The method of claim 1, wherein at least one of the second set of dies is at an edge of a wafer.

11. The method of claim 1, further comprising acquiring each of the test image and the images of the second set of dies from one of an optical microscope, a laser scanning system, a near-field microscope, an electron beam microscope, an ion beam microscope, an x-ray microscope, an atomic force microscope, or a ptychographic imaging system.

12. The method of claim 1, further comprising:
   forming a data matrix such that each column of the data matrix is an aligned image of a die; and
   decomposing the data matrix into two parts, wherein a first matrix of the two parts is low-rank and a second matrix of the two parts has at least one non-zero entity, wherein the second matrix includes isolated point defects and the first matrix includes a pattern of the wafer and process variations.

13. The method of claim 1, further comprising, using the processor, determining the computed reference image from the images of the second set of dies.

14. A system comprising:
   a processor in electronic communication with an electronic data storage unit and a wafer inspection tool, wherein the processor is configured to execute instructions that:
      determine a difference image between the test image and a computed reference image, wherein the computed reference image is derived from images of a second set of dies such that a norm of the difference image is minimized, wherein the computed reference image is a linear combination of terms, each term being a convolution of an adjustable filter with an image of one of the dies in the second set of dies; and
      detecting defects using the difference image.

15. The system of claim 14, wherein the wafer inspection tool is one of an optical microscope, a laser scanning system, a near-field microscope, an electron beam microscope, an ion beam microscope, an x-ray microscope, an atomic force microscope, or a ptychographic imaging system.

16. The system of claim 14, wherein a sum of squares of pixels of the difference image is minimized.

17. The system of claim 14, wherein each of the images of the second set of dies is acquired at different imaging conditions, and wherein the different imaging conditions include different parameters for at least one of illumination pupil shape, illumination polarization, illumination wavelength spectrum, focus, imaging numerical aperture, imaging pupil shape, imaging pupil analyzer, imaging pupil jones matrix, imaging pupil apodization, or imaging pupil wavefront.

18. The system of claim 14, wherein the processor is further configured to determine the computed reference image from the images of the second set of dies.

\* \* \* \* \*